United States Patent
Yoshihama (10) Patent No.: US 8,762,021 B2
(45) Date of Patent: Jun. 24, 2014

(54) DRIVING SUPPORT SYSTEM

(75) Inventor: Yuki Yoshihama, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/009,884

(22) PCT Filed: Apr. 8, 2011

(86) PCT No.: PCT/JP2011/058948
§ 371 (c)(1),
(2), (4) Date: Oct. 4, 2013

(87) PCT Pub. No.: WO2012/137355
PCT Pub. Date: Oct. 11, 2012

(65) Prior Publication Data
US 2014/0032072 A1    Jan. 30, 2014

(51) Int. Cl.
*G06F 19/00* (2011.01)
*B60K 31/00* (2006.01)

(52) U.S. Cl.
CPC ........ B60K 31/0075 (2013.01); *B60W 2550/14* (2013.01); *B60W 2550/146* (2013.01); *B60W 2550/143* (2013.01)
USPC ................... 701/70; 701/1; 701/72; 701/301; 606/5; 606/10; 606/12; 396/373; 180/272; 340/576; 348/148

(58) Field of Classification Search
CPC ................. B60W 2550/146; B60W 2550/143; B60W 2550/402; B60W 2540/10; B60W 2720/106; B60K 31/0075
USPC ................... 701/1, 70, 72, 301; 606/5, 10, 12; 396/373; 355/55; 180/272; 340/576; 348/148
See application file for complete search history.

(56) References Cited

U.S. PATENT DOCUMENTS

| | | | | |
|---|---|---|---|---|
| 5,969,969 A | * | 10/1999 | Ejiri et al. | 701/41 |
| 6,173,222 B1 | * | 1/2001 | Seo et al. | 701/41 |
| 6,567,726 B2 | * | 5/2003 | Sakiyama et al. | 701/1 |
| 8,063,752 B2 | * | 11/2011 | Oleg | 340/425.5 |
| 8,600,673 B2 | * | 12/2013 | Nakamura et al. | 701/514 |
| 8,630,793 B2 | * | 1/2014 | Takemura et al. | 701/301 |
| 2008/0294321 A1 | | 11/2008 | Yamakado et al. | |
| 2010/0324796 A1 | | 12/2010 | Takeuchi et al. | |

FOREIGN PATENT DOCUMENTS

| | | |
|---|---|---|
| JP | 2004-272426 A | 9/2004 |
| JP | 2005-202579 A | 7/2005 |
| JP | 2007-066179 A | 3/2007 |
| JP | 2007-106170 A | 4/2007 |
| JP | 2007-331580 A | 12/2007 |
| JP | 2008-290469 A | 12/2008 |
| JP | 2010-202042 A | 9/2010 |
| WO | 2009/101769 A1 | 8/2009 |

OTHER PUBLICATIONS

International Search Report of PCT/JP2011/058948 dated Jul. 12, 2011, English Translation.

* cited by examiner

*Primary Examiner* — McDieunel Marc
(74) *Attorney, Agent, or Firm* — Sughrue Mion, PLLC (57) ABSTRACT

A curve information acquisition unit configured to acquire information on a shape of a curvature changing portion of which a radius of curvature changes according to a predetermined function, a driving support unit configured to perform driving support for the driver at the time when the vehicle moves in the curvature changing portion, and a driving support control unit configured to decide timing at which the driving support unit performs driving support, based on the information on the shape of the curvature changing portion acquired by a curvature changing information acquisition unit.

9 Claims, 10 Drawing Sheets

DRIVING SUPPORT SYSTEM

CROSS REFERENCE TO RELATED APPLICATIONS

This is a National Stage of International Application No. PCT/JP2011/058948 filed Apr. 8, 2011, the content of all of which is incorporated herein by reference in its entirety.

TECHNICAL FIELD

The present invention relates to a driving support system which supports or aides the operation of a driver by sensing danger at the time when a moving object such as an automotive vehicle is running on a curve which has a curvature changing portion where a radius of curvature thereof changes according to a predetermined function and a curvature fixed portion where the radius of curvature is fixed or constant.

BACKGROUND ART

There have been proposed a variety of kinds of systems, such as a curve overspeed warning system (CSWS), an auto cruise control system (ACC), a lane keeping assistance system (LKA), a pre-crash safety system (PCS), etc., which serve to support the driving or operation of a vehicle. In such technologies, there has been known, for example, a system in which a curve and an obstacle existing on a travel path of an automotive vehicle are detected, and an optimum speed of the vehicle is calculated based on obstacle information and curve information, so that in cases where the speed of the vehicle is larger than an optimum speed, the vehicle is decelerated to the optimum speed by controlling a throttle mechanism and an automatic transmission (for example, refer to a first patent literature).

There is also a system which is provided with a unit for calculating a curvature of a road at every instant and a unit for controlling the speed of own vehicle, wherein when the curvature of the road at every instant tends to increase, the speed of the own vehicle is caused to decrease, whereas when the curvature at every instant tends to decrease, the speed of the vehicle is caused to increase (for instance, refer to a second patent literature). In addition, there have also been known a technology in which the shape of a road is acquired by a road shape acquisition unit, so that the radius of curvature of the road is calculated, and a technology in which in cases where the speed of an automotive vehicle is excessively high, the speed of the vehicle is decelerated from just before a curve, or a warning is issued, based on the radius of curvature thus calculated.

However, an actual driver often carries out driving in such a manner that he or she drives at a comparatively high speed in a straight line course, decelerates just before a curve, and accelerates after the end of the curve, in a repeated manner. Accordingly, even if the speed of a vehicle before the curve is higher than an optimum speed, as long as the vehicle speed is able to be decelerated to the optimum speed immediately before the curve, there will be no problem from the point of view of safe driving, so it might be an annoyance to the driver to limit the vehicle speed or to issue a warning only according to the radius of curvature of the curve, as referred to above.

CITATION LIST

Patent Literature

PTL 1: Japanese patent application laid-open No. 2007-106170
PTL 2: Japanese patent application laid-open No. 2008-290469
PTL 3: Japanese patent application laid-open No. 2004-272426

SUMMARY OF INVENTION

Technical Problem

The present invention has been made in view of the above-mentioned circumstances, and has for its object to provide a technology which is able to perform appropriate driving support for a driver of a vehicle in a curve of a road, etc., in cases where there exists a higher need for it.

Solutions to Problem

In order to achieve the above-mentioned object, the present invention has a major feature that information is acquired on a shape of a curve of which a radius of curvature changes according to a predetermined function, and timing at which driving support to the driver is carried out is decided on based on the information on the shape of the curve thus acquired.

More specifically, the present invention is characterized by comprising:

a curve information acquisition unit configured to acquire information on a shape of a curvature changing portion in a road, said road having the curvature changing portion of which a radius of curvature changes according to a predetermined function;

a driving support unit configured to perform driving support for a driver at the time when a vehicle moves in said curvature changing portion; and a driving support control unit configured to decide timing at which said driving support unit performs driving support, based on the information on the shape of said curvature changing portion acquired by said curve information acquisition unit.

Here, when the vehicle enters the curvature changing portion in which the radius of curvature thereof changes according to the predetermined function, the driver of the moving object such as a vehicle has a sense that the curve of the curvature changing portion normally ends at such a travel distance or in such a travel time. Accordingly, the driver may often make a mistake in steering operation or a mistake in acceleration and deceleration operation, thus giving rise to danger.

Accordingly, in the present invention, the curve information acquisition unit acquires the information on the shape of the curvature changing portion, and decides based on the information thus acquired, the timing at which driving support is performed for the driver. According to this, at the time when the vehicle actually comes into the curvature changing portion, thus causing a situation that danger will take place with high possibility, it becomes possible to carry out driving support for the driver. Therefore, it is possible to suppress the driver from feeling annoyance or troublesomeness due to the driving support being needlessly done, and at the same time, it becomes possible to carry out driving support in an appropriate manner in cases where danger will actually take place.

In addition, in the present invention, said driving support control unit may be configured to decide the timing at which said driving support unit performs driving support, based on a length of said curvature changing portion.

In that case, the length of the curvature changing portion is longer than that in the sense that the driver has, and hence, it is possible to suppress danger resulting from the driver's determination that the curvature changing portion has ended, in the middle of the curvature changing portion.

In addition, in the pre sent invention, in cases where the length of said curvature changing portion is equal to or more than a predetermined misjudgement threshold value, said driving support control unit may make a decision that said driving support unit performs driving support. In that case, it is possible to make a determination of driving support according to a clearer criterion.

Moreover, in the present invention, said misjudgement threshold value may be set or determined based on at least either one of a minimum easement length of a traveling lane of said vehicle according to a construction ordinance (government order), a distribution of an actual length of the curvature changing portion in the traveling lane of said vehicle, and a length of the curvature changing portion at which the driver of said vehicle misjudged in the past that said curvature changing portion ended. According to this, it becomes possible to carry out driving support at more appropriate timing in conditions under which the driver really needs help.

Further, in the present invention, said driving support control unit may be configured to decide the timing at which said driving support unit performs driving support, based on the length of said curvature changing portion and a speed of said vehicle. Alternatively, said driving support control unit may be configured to decide the timing at which said driving support unit performs driving support, based on a period of time for which said vehicle moves in said curvature changing portion along the shape of said curvature changing portion.

That is, in cases where driving support is performed for the driver, the timing of the driving support is decided on the basis of information on the speed of the vehicle in addition to the information on the length of the curvature changing portion. According to this, for example, even if a period of time of driving from the entrance of the vehicle into the curvature changing portion until the end of the curvature changing portion is longer than that of driver's sense, it is possible to decide, by using the period of time of driving as a reference, the timing at which the driving support is performed, thus making it possible to make a more variety of determinations.

In this case, in cases where the period of time for which said vehicle moves in said curvature changing portion is equal to or more than a predetermined misjudgement time threshold value, said driving support control unit may be configured to make a decision that said driving support unit performs driving support. Moreover, said misjudgement time threshold value may be set or determined based on a period of time at which the driver of said vehicle misjudged in the past that said curvature changing portion ended.

Furthermore, in the present invention, the content of said driving support may be automatic deceleration control of the speed of said vehicle or lane keeping control, in addition to a warning issued to the driver.

Here, note that the units for solving the problems in the present invention can be used by being combined with one another as much as possible.

Advantageous Effects of Invention

In the present invention, it becomes possible to perform appropriate driving support for a driver of a vehicle in a curve of a road, etc., in cases where there exists a higher need for it.

DESCRIPTION OF EMBODIMENTS

Hereinafter, best modes for carrying out this invention will be described in detail in an exemplary manner, while referring to the accompanying drawings.

First Embodiment

Figure 1:
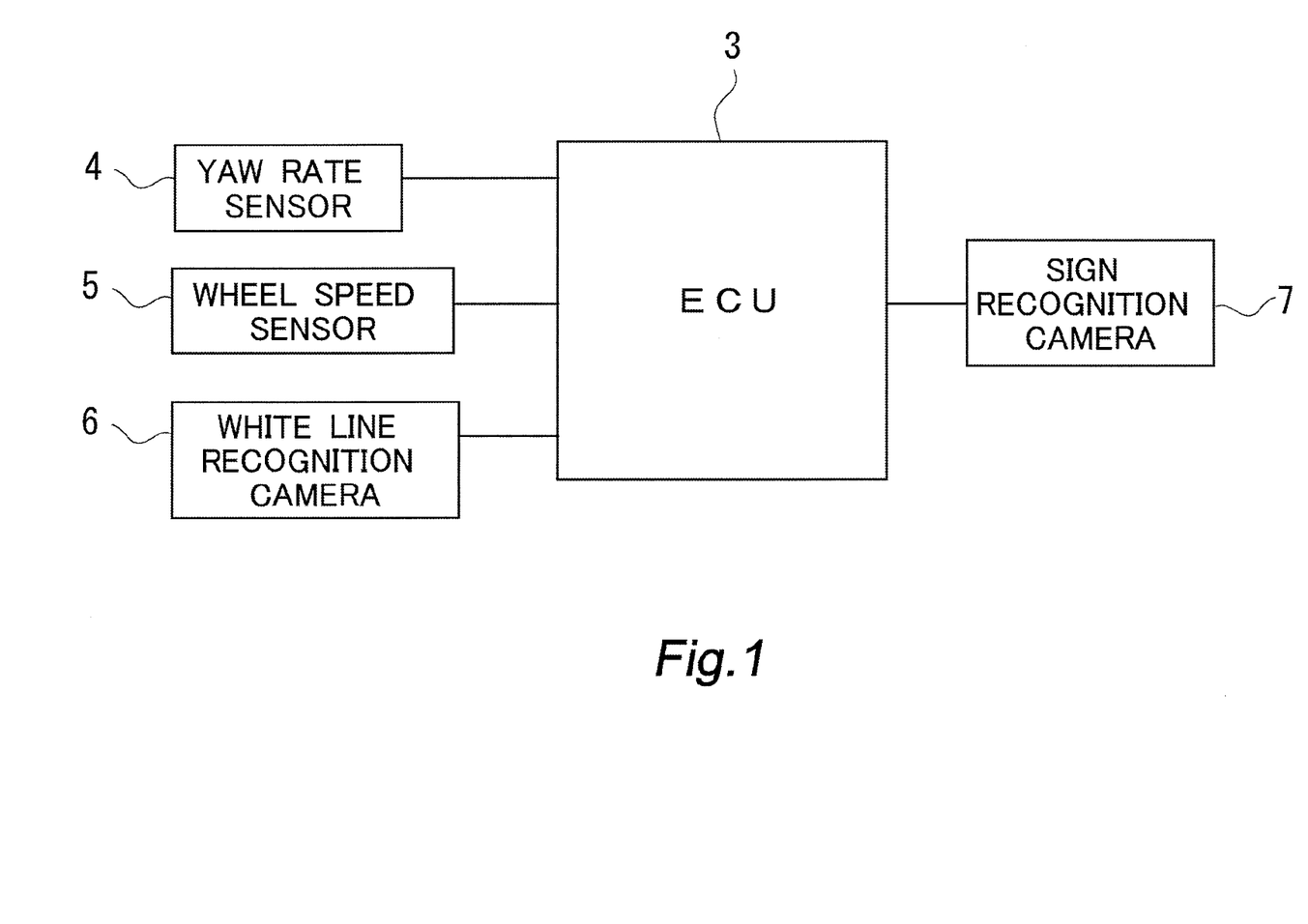
FIG. 1 is a block diagram showing a driving support system in a first embodiment of the present invention.

FIG. 1 is a block diagram showing the schematic construction of a driving support system for a vehicle according to this first embodiment of the present invention. The system is provided with an ECU 3 which is an electronically controlled computer for controlling an internal combustion engine. The ECU 3 is provided with a ROM, a RAM, a CPU, an input port, an output port, and so on, all of which are not illustrated, and a yaw rate sensor 4, a wheel speed sensor 5, a white line recognition camera 6, and a sign recognition camera 7 are electrically connected to the ECU 3.

A detection signal corresponding to a yaw rate of a vehicle and a wheel speed pulse synchronized with the rotation of a road wheel are supplied to the ECU 3 from the yaw rate sensor 4 and the wheel speed sensor 12, respectively. In addition, a white line, which divides traffic lanes in the vicinity of the vehicle, is photographed by means of the white line recognition camera 6, and traffic signs are also is photographed by means of the sign recognition camera 7, so that individual pieces of image information (photographed signals) are supplied to the ECU 3. Moreover, various programs including a warning execution determination routine to be described later have been stored in the ROM of the ECU 3 and are executed by the ECU 3.

Figure 2:
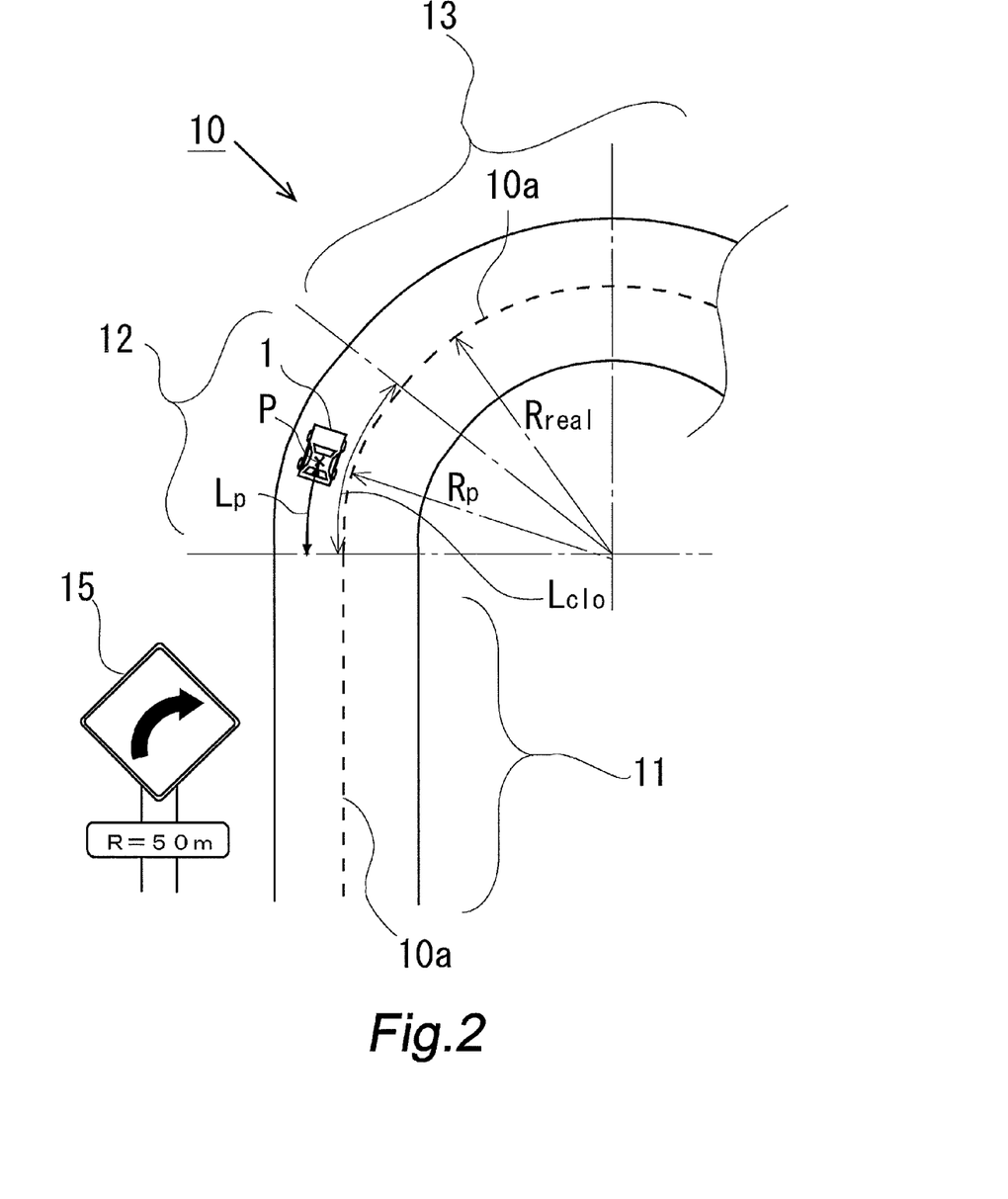
FIG. 2 is a view for explaining processing of estimating the shape of a road in the first embodiment of the present invention.

FIG. 2 is a view for explaining processing of estimating the shape of a road in the case where a vehicle 1 is coming to a curve of a road 10 during traveling. The curve of this road 10 is composed of a straight line portion 11, a curve easement portion 12 in the form of a curvature changing portion which is connected to the straight line portion 11 with a radius of curvature thereof gradually decreasing, and a perfect circle curve portion 13 which is connected to the curve easement portion 12 with a radius of curvature thereof being minimal and constant. Though a portion ahead of the perfect circle curve portion 13 is omitted in FIG. 1, the perfect circle curve portion 13 is connected to an exit side straight line portion through an exit side curve easement portion of which the radius of curvature gradually increases. Here, note that the curve easement portion 12 has a shape defined by a clothoid curve.

This clothoid curve is a curve in which the relation between a distance L from an origin of the curve and a radius of curvature R thereof is represented by the following expression (1).

$$L \times R = A^2 \quad (1)$$

Here, $A^2$ is a constant that defines the shape of the clothoid curve. Hereafter, an example of a procedure for acquiring information on the road shape will be described.

In FIG. 2, the vehicle 1 as a moving object is located in the curve easement portion 12. In a current position P of the vehicle 1, what is ahead of the vehicle 1 is photographed by means of the white line recognition camera 6, and an image of a white line 10a is recognized from the image information thus photographed. Then, a distance between the white line 10a and the vehicle 1 (a white line transverse position) is calculated on the basis of the photographed image information, and the posture of the vehicle 1 with respect to the white line 10a is calculated based on the result of the above calculation. Further, the speed Vs(t) of the vehicle 1 is acquired by detecting the yaw angle of the vehicle 1 from the detection signal of the yaw rate sensor 4, and at the same time, by detecting the wheel speed pulse from the wheel speed sensor 5. Then, by integrating this speed Vs(t) as shown in the following expression (2), the distance Lp from the origin (start point) of the curve easement portion 12 to the current position P of the vehicle 1 is acquired.

$$Lp = \int Vs(t)dt \quad (2)$$

In addition, the shape of the white line 10a and the radius of curvature Rp of the road in the current position P are calculated on the basis of the posture of the vehicle 1 with respect to the white line 10a and the vehicular swept path. A well-known method is used for such calculation, and so, the explanation thereof is omitted here.

Subsequently, a constant $A^2$ in the clothoid curve is calculated according to the values of Rp and Lp thus obtained in the following manner.

$$Lp \times Rp = A^2 \quad (3)$$

Moreover, in the straight line portion 11 before the vehicle comes to the curve, a traffic sign 15 is photographed by the sign recognition camera 7, and the radius of curvature Rreal of the perfect circle curve portion 13 is acquired based on the photographed image information. Then, the length Lclo of the curve easement portion 12 is derived from the following expression (4).

$$Lclo = A^2 / Rreal \quad (4)$$

Finally, the curved shape of the road 10 is specified as follows.

$$R(L) = A^2/L \, (0 \leq L \leq Lclo) \quad (5)$$

$$R(L) = Rreal \, (L \geq Lclo) \quad (6)$$

Figure 3:
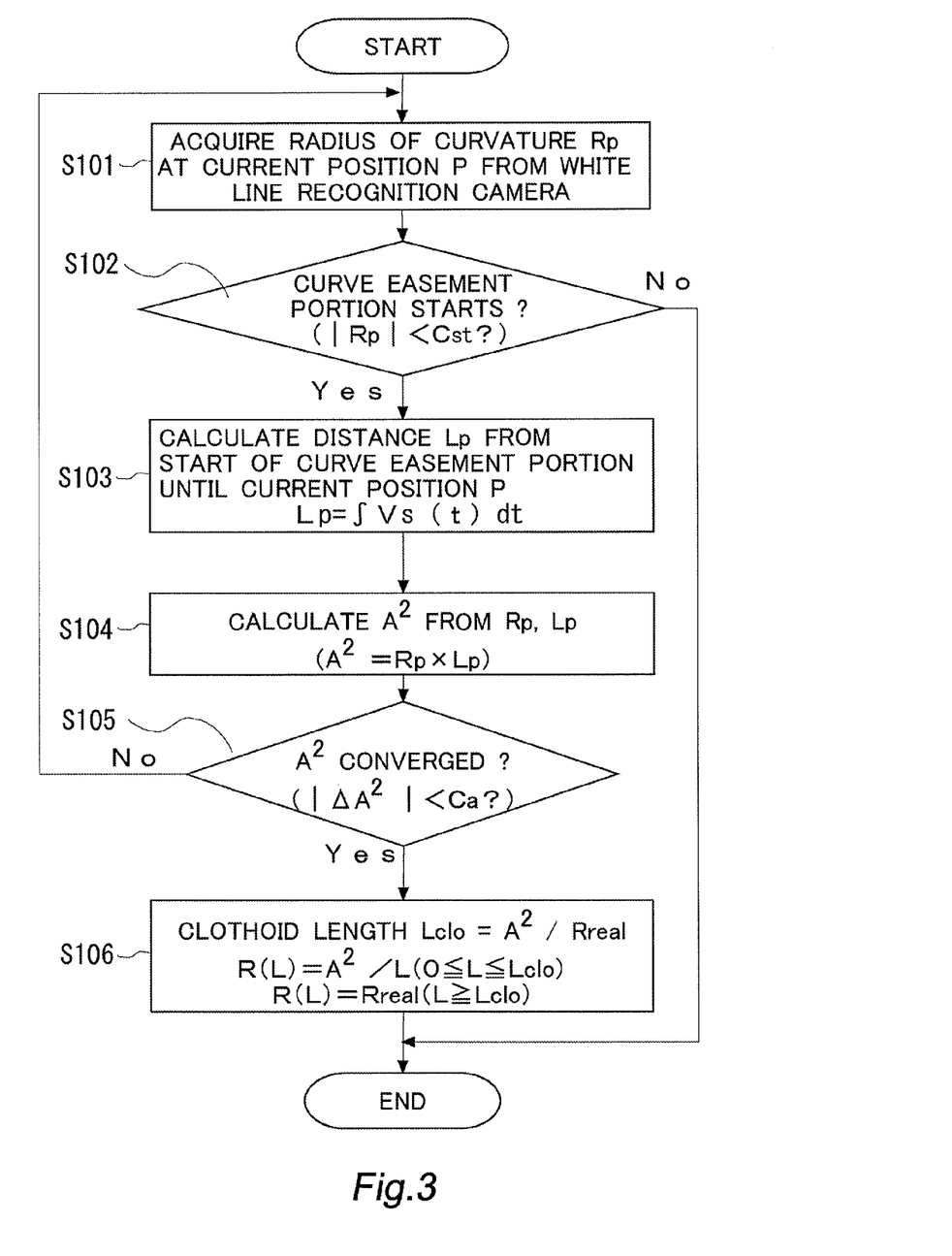
FIG. 3 is a flow chart showing a road shape estimation routine in the first embodiment of the present invention.

FIG. C shows a flow chart for a road shape estimation routine. This routine is one of the programs stored in the ROM of the ECU 3, and is executed by the ECU 3 at every predetermined period or interval during the travel of the vehicle 1. When this routine is executed, first, in step S101, the radius of curvature Rp of the curve in the current position P is acquired based on the image taken by the white line recognition camera 6. After the processing in step S101 is finished, the routine advances to step S102.

In step S102, it is determined whether the curve easement portion 12 has started. Specifically, this determination is made by whether or not the absolute value of Rp acquired in step S101 is smaller than a threshold Cst which has been set beforehand. Here, when the absolute value of Rp is more than Cst, a determination is made that the vehicle 1 is located in the straight line portion 11, and that the curve easement portion 12 has not yet started, and hence, this routine is once ended as it is. On the other hand, when the absolute value of Rp is smaller than Cst, a determination is made that the curve easement portion 12 has started, so the routine advances to step S103. Here, note that Cst is a threshold value by which it is determined that the curve easement portion 12 has not yet started, in the case where the absolute value of Rp is equal to or more than Cst, and it may be set theoretically or by experiments.

In step S103, the distance Lp from the start point of the curve easement portion 12 to the current value P is calculated by the use of the vehicle speed Vs(t) obtained from the detection signal of the wheel speed sensor 5. Specifically, Lp is calculated according to the above-mentioned expression (2). When the processing in step S103 is finished, the routine advances to step S104.

Then, in step S104, the value of $A^2$ is calculated. Specifically, it is calculated from Rp acquired in step S101 and Lp calculated in step S103, according to the above-mentioned expression (3). After the processing in step S104 is finished, the routine advances to step S105.

Subsequently, in step S105, it is determined whether the value of $A^2$ converges. Specifically, it is determined whether the absolute value of a difference $\Delta A^2$ between $A^2$ at the time when the processing of step S105 was carried out at the last time and $A^2$ at the time when the processing of step S105 has been carried out at the current time is smaller than Ca which is a preset threshold value. Here, when a negative determination is made, a return to step S101 is carried out. On the other hand, when an affirmative determination is made, the routine advances to step S106. Here, Ca is a threshold value with which when the absolute value of the difference $\Delta A^2$ for $A^2$ is smaller than this value, a determination is made that the value of $A^2$ is stable to a sufficient extent with no problem in accuracy, and it may beforehand be set theoretically or by experiments.

In step S106, the length Lclo of the curve easement portion 12 is calculated as the length of the clothoid curve according to the above-mentioned expression (4). In addition, finally, the shape of the curve is calculated as shown in the above-mentioned expressions (5) and (6). When the processing in step S106 is finished, this routine is once ended. Here, note that the ECU 3, the yaw rate sensor 4, the wheel speed sensor 5, the white line recognition camera 6, and the sign recognition camera 7, which together execute the above-mentioned road shape estimation routine, constitute a curve information acquisition unit. Moreover, in cases where the information on the shape of the curve is acquired by using a car navigation system instead of the above-mentioned component, the car navigation system constitutes the curve information acquisition unit.

Here, in the fast, in cases where the vehicle speed was too fast with respect to the radius of curvature of the curve thus acquired and hence a determination was made that a centrifugal force generated became large, thereby giving rise to danger, driving support has been carried out in such a manner that the speed of the vehicle 1 has been decelerated in an automatic manner, or a warning has been provided to the driver. However, in actuality, even if the vehicle speed before the vehicle had come into the curve was high, danger would not be caused when the driver appropriately reduced the vehicle speed in the curve, and so on the contrary, the driver might sometimes feel the driving support to be annoying. Accordingly, in cases where driving support is performed by using the shape of the curve obtained as mentioned above, it is necessary to carry out the driving support only when it is really needed for the driver.

Here, danger occurring particularly at the time when the vehicle 1 is running on the curve may often be caused in cases where the driver has misjudged the length of the curve to be shorter than its actual length and has not performed a steering wheel operation and a deceleration operation in an appropriate manner. More specifically, it is the case where the length of the curve easement portion 12 is longer than that expected by of the driver, or the radius of curvature thereof is smaller than that expected. Accordingly, in the present invention, it has been assumed that driving support is carried out only when the length of the curve easement portion 12 is longer than a predetermined misjudgement threshold. Here, note that in the following, description will be made by taking, as an example of driving support, the case where a warning is issued to a driver, but the content of driving support may of course be other than this, i.e., such as vehicle speed control (forced deceleration), lane keeping control, and so on.

Figure 4:
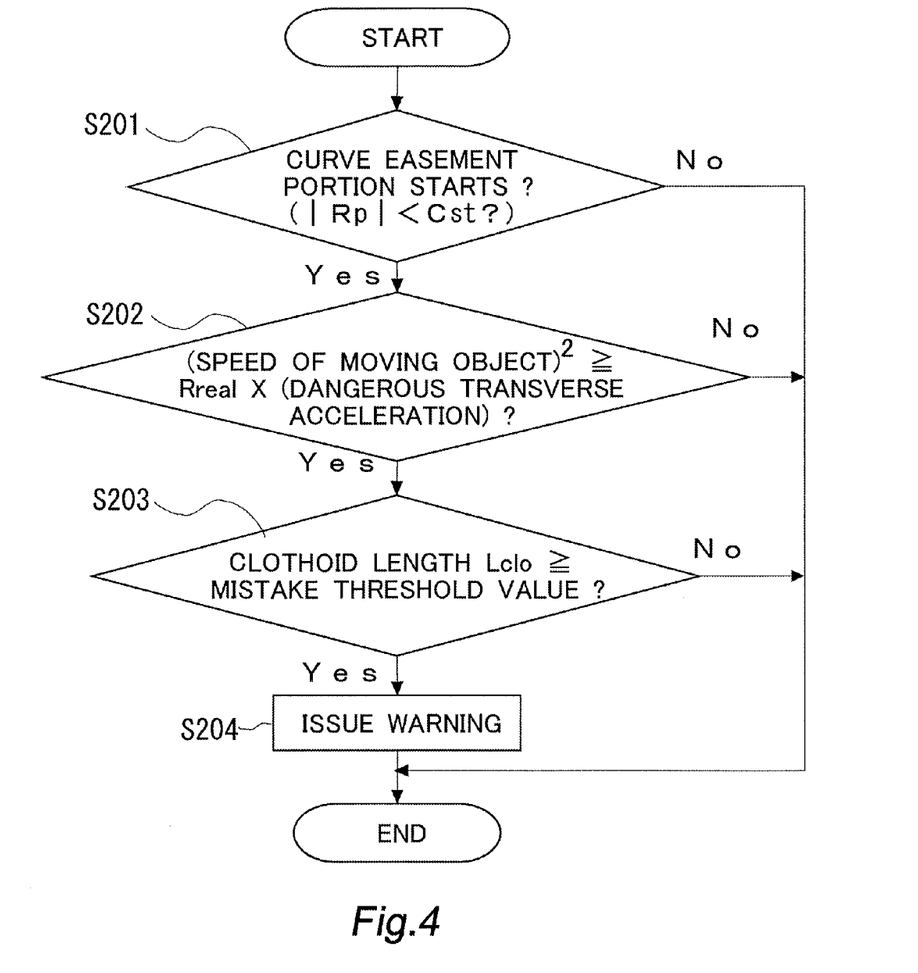
FIG. 4 is a flow chart showing a warning execution determination routine in the first embodiment of the present invention.

FIG. 4 is a flow chart showing a warning execution determination routine in this embodiment. This routine is a program stored in the ROM of the ECU 3, and is executed at every predetermined period of time during the operation of the engine. When this routine is executed, first, in step S201, it is determined whether the vehicle 1 has come into a curve. Specifically, this determination may be made according to whether or not the radius of curvature Rp at the position of the vehicle 1 in the curve easement portion 12 is smaller than the threshold value Cst, similar to the processing of step S102 in the road shape estimation routine shown in FIG. 3. Here, when a negative determination is made, it is determined that the vehicle 1 is running on the straight line portion 11, and so this routine is once ended. On the other hand, when an affirmative determination is made, it is determined that the vehicle 1 has come into the curve easement portion 12, and then the routine advances to step S202.

In step S202, it is determined whether the speed of the vehicle 1 obtained from the outputs of the yaw rate sensor 4 and the wheel speed sensor 5 satisfies the following expression (7).

$$(Vs(t))^2 \geq Rreal \times \alpha d \qquad (7)$$

Here, Rreal is the radius of curvature of the perfect circle curve portion 13. Also, αd is a dangerous transverse acceleration at which danger begins to be generated in driving the vehicle 1, and it has beforehand been set by experiments, etc.

The value of this dangerous transverse acceleration ad may be about 0.4 G, for example. When a negative determination is made in step S202, it is determined that there is no necessity for a warning at this point, and so this routine is once ended. On the other hand, when an affirmative determination is made, the routine advances to step S203.

In step S203, it is determined whether the length Lclo of the curve easement portion 12 (clothoid length) is equal to or more than a predetermined misjudgement threshold value LE. Here, the misjudgement threshold value LE is a curve length as a threshold value in which if the length of the curve easement portion 12 is equal to or more than this, drivers will become liable to make an error in steering wheel operation or acceleration and deceleration operations, based on their usual or normal sense, thus making it easy to cause danger. How to decide this misjudgement threshold value will be described later. In cases where a negative determination is made in step S203, a determination is made that there is no need for a warning, and hence this routine is ended as it is. On the other hand, in cases where an affirmative determination is made in step S203, a determination is made that there is a need for a warning, and then the routine advances to S204. In step S204, a warning is issued. Specifically, various means such as displaying on a display device in front of a driver's seat, turning on a warning lamp, and alarming by voice can be used. When the processing in step S204 is finished, this routine is once ended. Here, the ECU 3, which executes the processing in step S204, the display device in front of the driver's seat, the warning lamp, an alarming device by voice, and so on, which are not illustrated, together constitute a driving support unit.

As described above, in this embodiment, it has been assumed that the length Lclo of the curve easement portion 12 is calculated, and that when the length Lclo of the curve easement portion 12 thus calculated is equal to or more than the predetermined misjudgement threshold value LE, a warning to the driver is carried out. According to this, only when there is indeed a need for arousing to the driver, a warning can be issued, thereby making it possible to achieve more appropriate or adequate driving support. Here, note that the ECU 3, which executes the above-mentioned warning execution determination routine, constitutes a driving support control unit in this embodiment.

In addition, although it has been assumed that a warning is issued when an affirmative determination is made in all the three determinations in steps S201 through S203 in the above-mentioned warning execution determination routine, it is not necessarily required that all the three affirmative determinations are made. For instance, in cases where information on the shape of the curve has been acquired before the vehicle comes into the curve, the determination in step S201 is not necessary. Moreover, the determination in step S202 is supplementary or ancillary.

Second Embodiment

Figure 5:
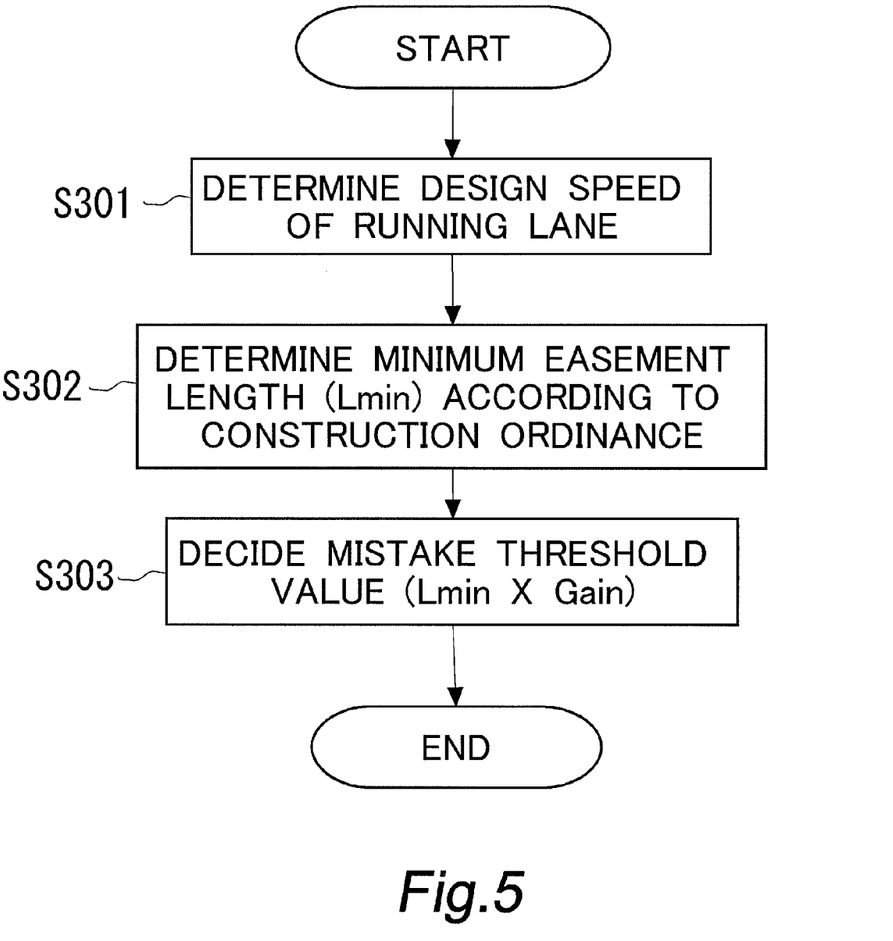
FIG. 5 is a flow chart showing a misjudgement threshold value decision routine in a second embodiment of the present invention.

In this second embodiment of the present invention, reference will be made to a method of deciding the misjudgement threshold value LE described in the first embodiment. FIG. 5 shows a flow chart for a misjudgement threshold value decision routine in this second embodiment. When this routine is executed, in step S301, a design speed of a road on which the vehicle 1 is running is obtained. This design speed is a running speed which has been assumed from the viewpoint of the design of the road, and it may sometimes be set in consideration of the location and state of use of the road. In addition, this design speed may be considered to substantially correspond to a limiting speed in roads, other than those in urban areas, where substantial or practical execution of this routine is expected. Moreover, this design speed may be acquired by taking in the image information of a traffic sign by means of the sign recognition camera 7, or it may be acquired by a method of obtaining the width of the road from GPS information on the car navigation system, and then by calculating back the design speed from the road width thus obtained. After the processing in step S301 is finished, the routine advances to step S302.

In step S302, a minimum easement length Lmin defined by a construction ordinance (government order) is obtained. This minimum easement length Lmin is defined by the construction ordinance as a minimum value of an easement length of the curve which can be taken for the design speed of the road. Accordingly, it is possible to obtain the minimum easement length Lmin of the road on which the vehicle 1 is running, from the value of the design speed obtained in step S302. After the processing in step S302 is finished, the routine advances to step S303. In step S303, the misjudgement threshold value LE is calculated by multiplying Lmin by a coefficient Gain. Here, Gain is a constant which is provided by experiments, etc., also in consideration of a driver's sense, and for instance, it may be a value of 1.5-2.5.

As described above in this embodiment, the misjudgement threshold value LE has been decided by obtaining the design speed of a road on which the vehicle 1 is running by using the sign recognition camera 7 or the car navigation system, then by calculating the minimum easement length Lmin of the road from the design speed thus obtained, and further by multiplying the minimum easement length Lmin by the appropriate coefficient Gain. According to this, information on the road on which the vehicle 1 is actually running can be immediately acquired, so that the misjudgement threshold value LE with high accuracy can be decided in real time on the basis of this information.

Third Embodiment

Figure 6:
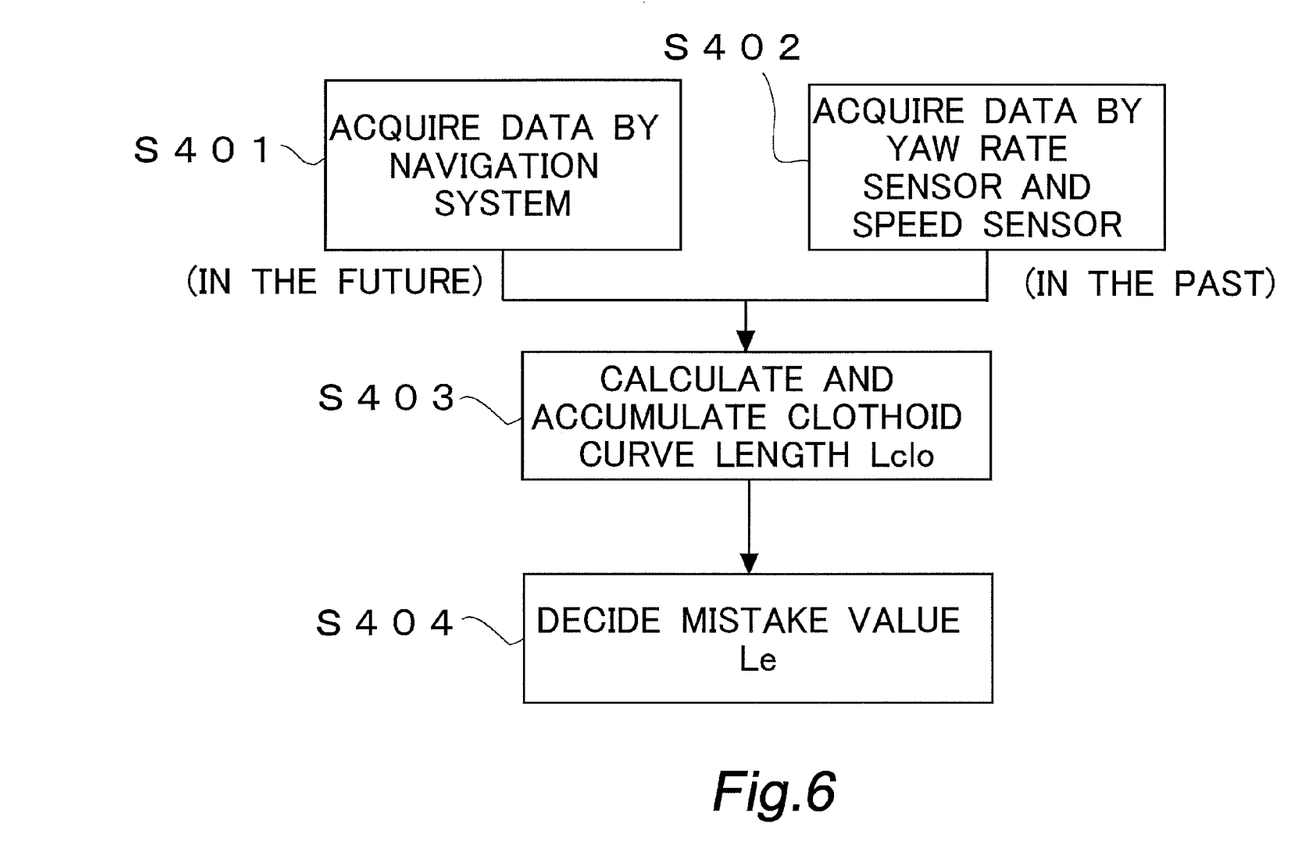
FIG. 6 is a block diagram showing a misjudgement threshold value decision routine 2 in a third embodiment of the present invention.

Now, reference will be made to another method of deciding the misjudgement threshold value LE. This method is to accumulate data on the lengths of curve easement portions 12 of roads on which the vehicle 1 has actually run, and to decide the misjudgement threshold value LE from the data thus. A flow chart for a misjudgement threshold value decision routine 2 used in this case is shown in FIG. 6. When this embodiment is carried out, in step S401, the values of Lp and Rp are obtained according to the procedure as shown in the road shape estimation routine of FIG. 3, by means of autonomous sensors such as the yaw rate sensor 4 and the wheel speed sensor 5. Then, in step S402, the values of Lp and Rp are obtained from GPS data of the car navigation system.

In this routine, the processing in either one of steps S401 and S402 only has to be done. That is, the values of Lp and Rp only have to be obtained by either the method using the autonomous sensors or the method using the car navigation system. Then, in step S403, even in the case of using the autonomous sensors or in the case of using the car navigation system, the length Lclo of the curve easement portion 12 is obtained according to the calculation operations in steps S104 through S106 as shown in FIG. 3, and these data thus obtained are accumulated. Thereafter, in step S404, the misjudgement threshold value LE is decided by the use of the data Lclo thus accumulated.

Figure 7:
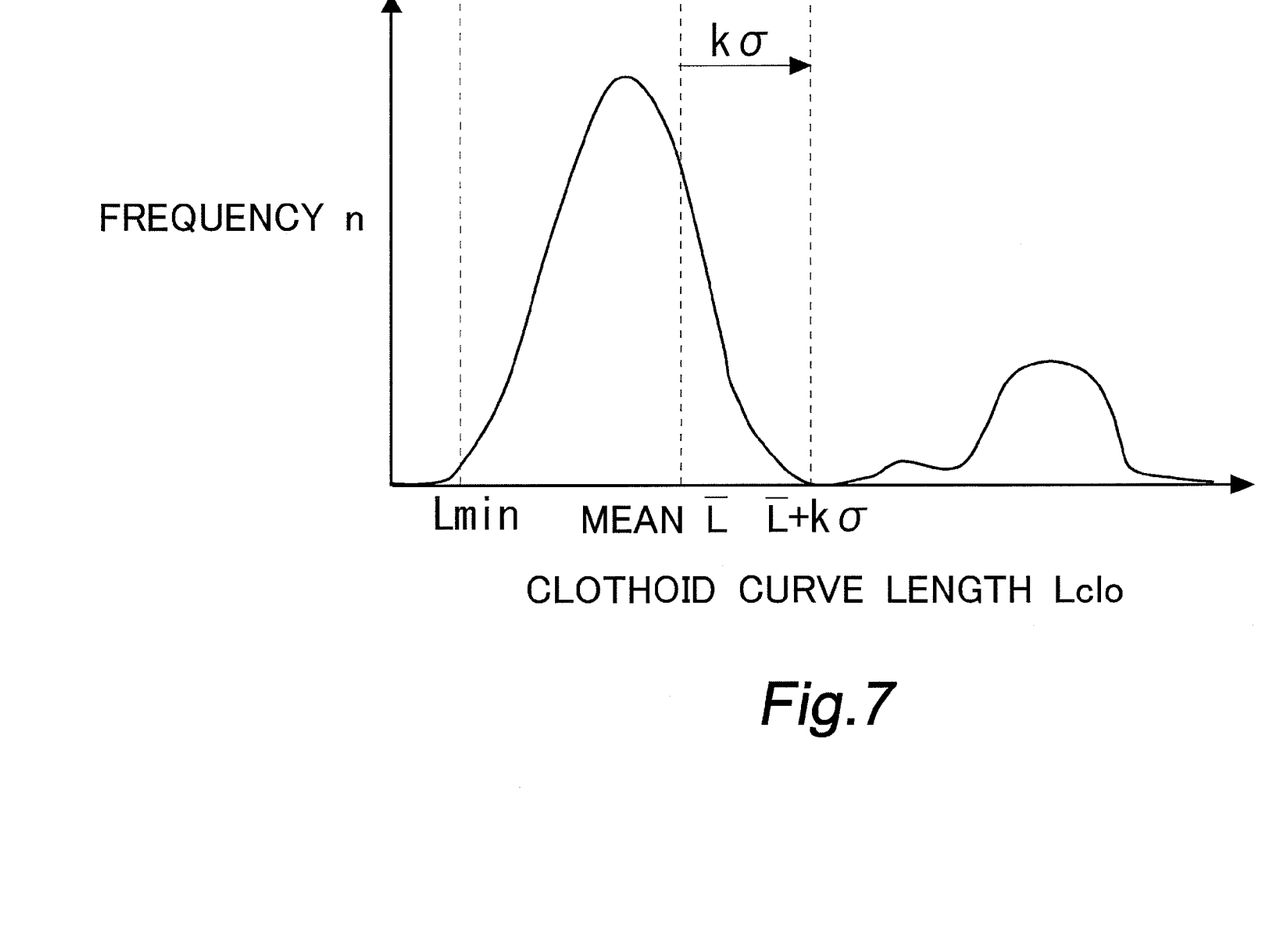
FIG. 7 is a view showing a distribution of lengths of curve easement portions in the third embodiment of the present invention.

FIG. 7 shows an example of a distribution of the lengths Lclo of the curve easement portions 12 thus accumulated. As shown in this figure, in the distribution of the lengths Lclo of the curve easement portions 12, there may exist small peaks in addition to large peaks in the shape of a normal distribution. And, Lclo will basically take a value equal to or more than Lmin which is stipulated by the construction ordinance, so a left end of the distribution curve becomes Lmin. In this embodiment, the misjudgement threshold value LE is a value which is an average or mean value of Lclo added by a margin. For instance, in FIG. 7, k times of a standard deviation is added to the mean value of Lclo (k=1-3). In this case, with respect to the distribution of Lclo, the misjudgement threshold value LE can be made to be a value which is larger than the large peak of a normal distribution, and is equal to or less than a peak which is, like a singular point, a little away from the large peak. For this reason, driving support is not carried out particularly for a curve which constitutes a large peak in the distribution of Lclo, whereas driving support can be performed in cases where the vehicle passes through a curve corresponding to an exceptional peak which is a little away from the large peak.

According to this embodiment, on the basis of past data which have been detected and accumulated by means of the autonomous sensors while the vehicle has been running on the curve easement portion 12, or on the basis of, so to speak, future data as detected and accumulated by means of the GPS of the car navigation system, the distribution of the length Lclo of the curve easement portion 12 has been calculated, and the misjudgement threshold value LE has been set as a value which is larger by a predetermined amount that the mean value of the distribution. Accordingly, it is possible to obtain the more practical misjudgement threshold value LE based on the data of the roads which the vehicle 1 actually passed through in the past or based on the data of the roads which the vehicle 1 will actually pass through in the future. As for which is to be used between the past data detected and accumulated by means of the autonomous sensors during the vehicle running in the curve easement portion 12 and the future data detected and accumulated by means of the GPS of the car navigation system, for example, when the past data detected by the autonomous sensors has become invalid, such as when the type of the lane has changed, the past data may be changed over into the future data detected by the GPS.

Figure 8:
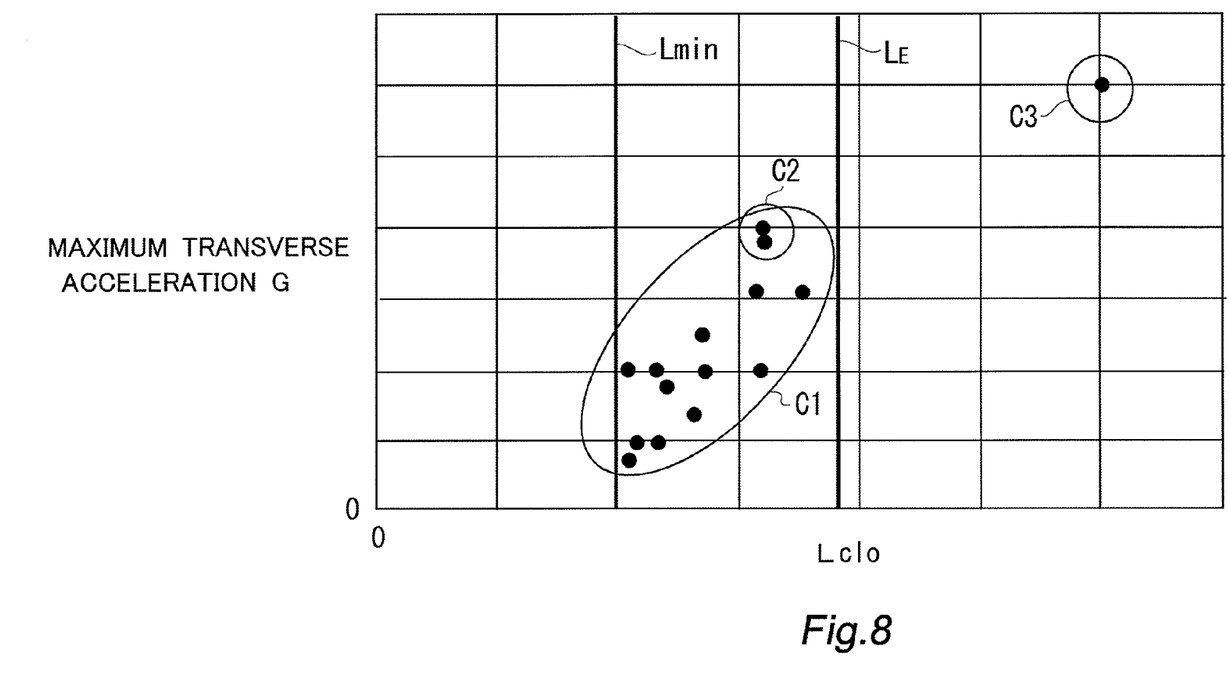
FIG. 8 is a view showing a distribution of the relation between lengths Lclo of a plurality of curve easement portions 12 and maximum transverse gravities G generated at those times, respectively, in the third embodiment of the present invention.

Here, note that in FIG. 8, there is shown a distribution of the relation between lengths Lclo of a plurality of curve easement portions 12 and maximum transverse gravities G generated at that time, acquired in this third embodiment of the present invention. In FIG. 8, a horizontal axis represents the lengths Lclo of the curve easement portions 12, respectively. In addition, a vertical axis represents maximum transverse or horizontal gravities G measured at the time when the vehicle passes through the curve easement portions 12, respectively. In this distribution, those curves which belong to a curve group C1 at the lower left are auxiliary curves in which it is considered that the driver does not feel danger so much at the time of passing through these curves.

On the other hand, in a curve C3 which exists in the upper right like a singular point, the length Lclo of the curve easement portion 12 is longer, though the radius of curvature Rreal of the perfect circle curve portion 13 is equal, as compared with that in a curve group C2 distributed or located at the center. In addition, the maximum transverse acceleration G becomes larger, too. When passing through a curve such as this curve C3, the driver often feels danger. In this embodiment, by setting the misjudgement threshold value LE in a region shown in FIG. 7, it is consequently possible to set, in FIG. 8, the misjudgement threshold value LE in a manner as shown in this figure, so that a warning can be issued only when the vehicle 1 passes through a singular or special curve such as the curve C3, thereby making it possible to carry out driving support only when the vehicle 1 passes through a dangerous curve.

Fourth Embodiment

Figure 9:
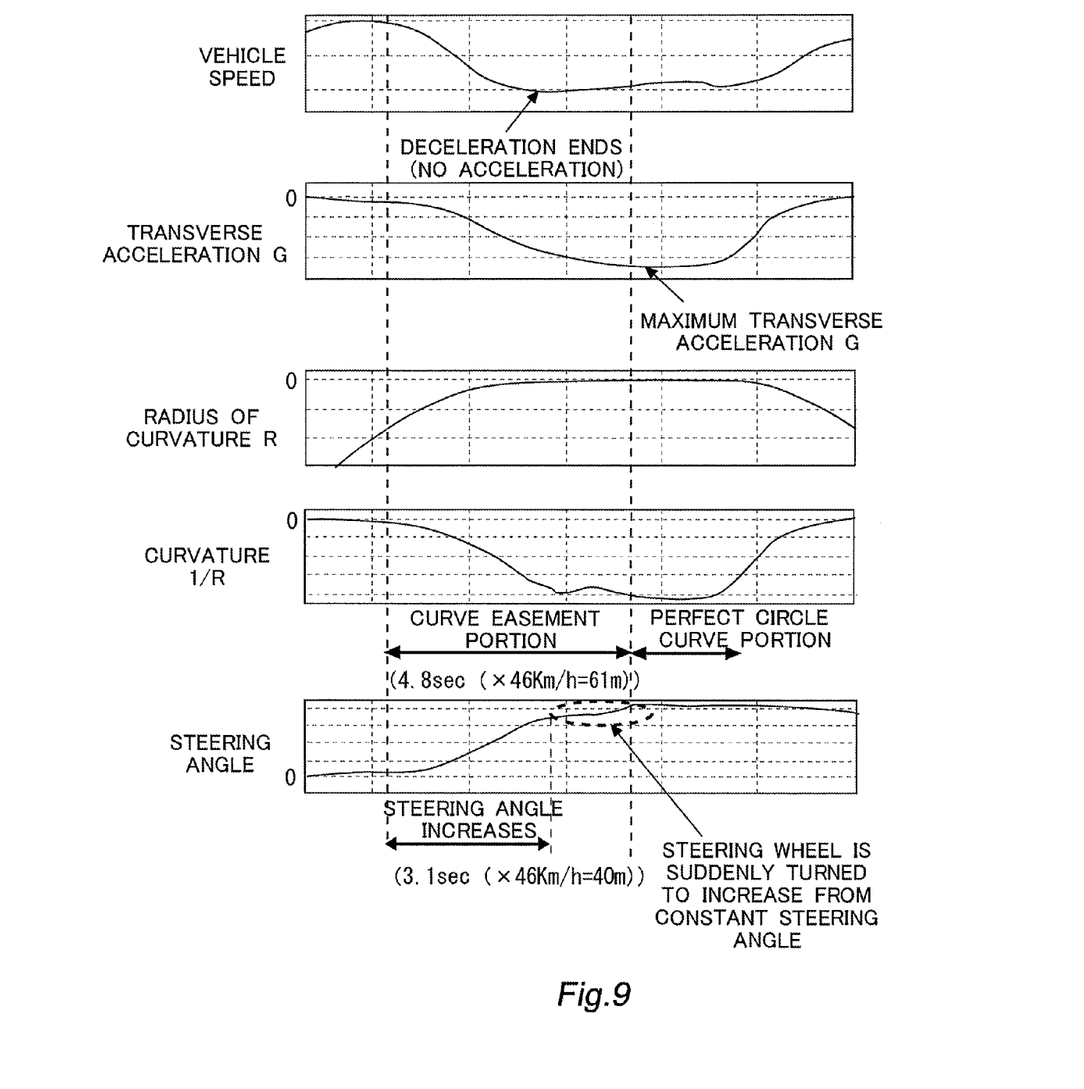
FIG. 9 is an example of a graph showing a change over time of each parameter at the time when an actual driver has passed through a curve, in a fourth embodiment of the present invention.

Next, reference will be made to a further other example of a method of deciding the misjudgement threshold value LE. The method in this fourth embodiment is to obtain the misjudgement threshold value LE by using the data of each parameter on a site where an actual driver felt danger in a curve. FIG. 9 is a graph showing the changes over time of a vehicle speed Vs (t), a transverse acceleration G, a radius of curvature R, a curvature (1/R), and a steering angle at the time when the actual driver has passed the curve. It is understood from the changes in the radius of curvature R and the curvature (1/R) in this graph that the time required for the vehicle 1 to pass through the curve easement portion 12 is 4.8 sec. In addition, it is also understood from a vehicle speed of 46 km/h at that time that the length Lclo of the curve easement portion 12 is 61 m.

At the same time, it is understood from FIG. 9 that the driver made the steering angle constant by stopping the steering wheel from being kept turned at the time of traveling on the curve indexation portion 12 for a period of time of 3.1 sec (40 m). In addition, it is also understood that the driver thereafter felt danger and increased the steering angle by turning again the steering wheel. That is, in the case of this driver, he or she assumed that the distance until the curve easement portion 12 had ended was about 40 m and the time until the curve easement portion 12 had ended was 3.1 sec., and once took action based on such an assumption while thinking that the curve easement portion 12 had ended, but thereafter made haste to turn again the steering wheel by taking notice of the fact that the curve easement portion 12 had not yet ended. Accordingly, in this embodiment, a result of 40 m, which is obtained by multiplying the value based on the driver's assumption by an appropriate coefficient Gain, is decided to be the misjudgement threshold value LE. For instance, in cases where Gain is set to be 1.5, the misjudgement threshold value LE becomes 60 m. According to the method of this embodiment, it is possible to decide the misjudgement threshold value LE by taking into consideration the characteristics of the individual driver, thus making it possible to suppress the occurrence of danger during traveling on a curve.

Here, note that in this embodiment, the distance, for which the driver assumes that the curve easement portion 12 will finally end, is obtained, but the data collected in this embodiment are the changes over time of the individual parameters, and hence, in such a case, a misjudgement time threshold value TE may be calculated from a period of time for which the driver assumes that the curve easement portion 12 will end. Specifically, the period of time for which the driver assumed that the curve easement portion 12 would end was 3.1 sec., and hence, for instance, 4.65 sec., which is obtained by multiplying this period of time by a coefficient Gain of 1.5, may be set to be the misjudgement time threshold value TE, so that a warning is issued at the time when the passage time of the curve easement portion 12 becomes equal to or more than the misjudgement time threshold value TE. Of course, other values may be adopted as the coefficient Gain.

Figure 10:
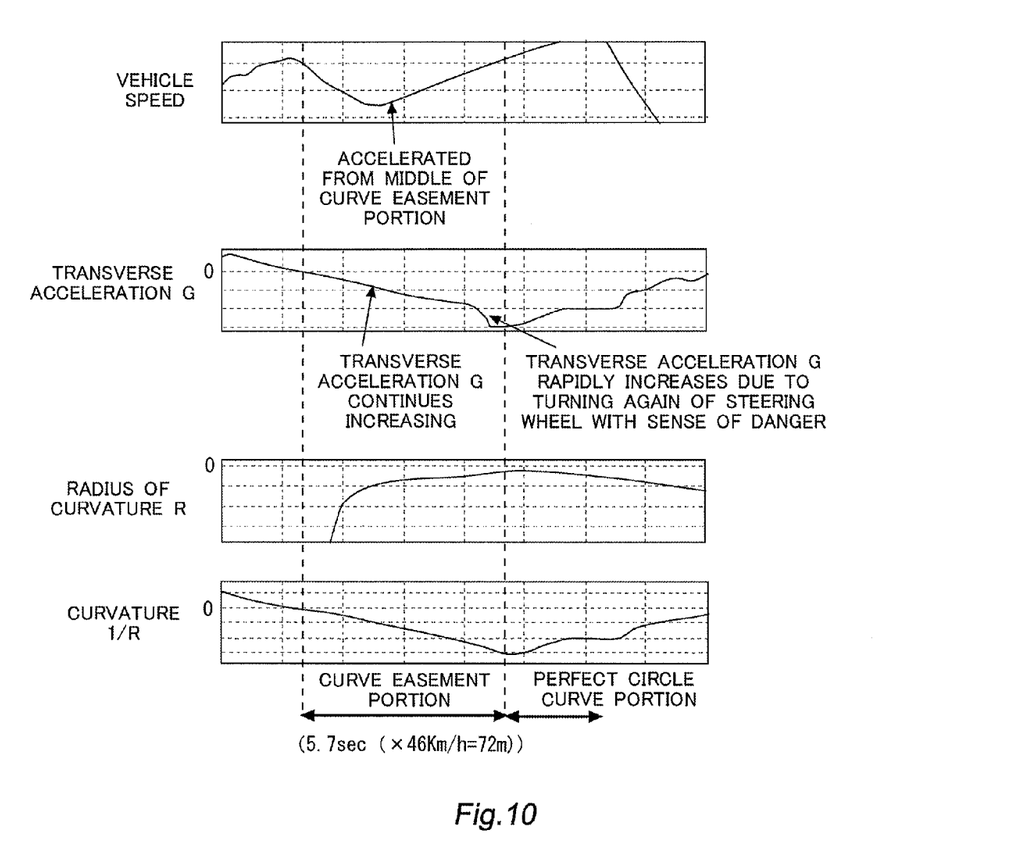
FIG. 10 is another example of a graph showing a change over time of each parameter at the time when an actual driver has passed through a curve, in the fourth embodiment of the present invention.

Next, another example of the method of obtaining the misjudgement threshold value LE or the misjudgement time threshold value TE will be described by using individual pieces of data in cases where the actual driver felt danger in curves. In the example of FIG. 9, the distance (time) for which the driver assumed that the curve would end was estimated by focusing attention on a change in the operation (steering angle) of the steering wheel by the driver, but in the following example, attention is focused on the timing of acceleration and deceleration by the driver. FIG. 10 shows a graph in which the changes over time of the vehicle speed Vs(t), the transverse acceleration G, the radius of curvature R, and the curvature (1/R) at the time when an actual driver passed through a curve. In actuality, data were taken at the time when the vehicle 1 passed through a curve corresponding to the curve C3 in FIG. 8.

In the case of this driver, he or she assumed that the curve would end at a time point of 5.7 sec (72 m) after the vehicle had come into the curve easement portion 12, and started accelerating. Then, after that, the driver caught a scent of danger before having had gone into the perfect circle curve portion 13, and operated the steering wheel rapidly, so that the transverse acceleration G formed a steep peak at that timing. From such information, the misjudgement threshold value LE for this driver should be set to a distance which is obtained by multiplying 72 m by Gain, or it should be set to a time which is obtained by multiplying 5.7 sec. by Gain.

As described above, according to this embodiment, it is possible to set an optimum misjudgement threshold value LE or an optimum misjudgement time threshold value TE for the driver by taking into consideration the habit or characteristics of each driver, thereby making it possible to achieve finer and more sophisticated driving support.

Here note that in the above-mentioned embodiments, the white line recognition camera 6, the yaw rate sensor 4, and the wheel speed sensor 5 are used as autonomous sensors, but other sensors may be used as long as they can detect information on the shape of the curve easement portion 12. In addition, although in the above-mentioned embodiments, it is presupposed that the curve easement portion 12 is defined by the function of a clothoid curve, the present invention can also be applied to a road of which a curve easement portion is defined by other functions. As the other functions, there can be mentioned a curve of the second order (quadratic curve), for instance In addition, in the above-mentioned embodiments, reference has been made to examples in which acquisition and calculation of data on the shape of the curve easement portion 12, decision of the misjudgement threshold value LE and the misjudgement time threshold value TE, and determination of the execution of driving support are carried out by means of the ECU 3. However, the present invention is not limited to such a configuration. For example, it may be configured such that each vehicle 1 and information center are placed into a condition in which they are able to communicate with each other by wireless or radio communication means, and the above-mentioned processing is carried out by the information center, so that an instruction for driving support is transmitted from the information center to each vehicle 1. Moreover, the information on the shape of the curve easement portion 12 may be acquired from an outside server.

REFERENCE SIGNS LIST

1 . . . vehicle
3 . . . ECU
4 . . . yaw rate sensor
5 . . . wheel speed sensor
6 . . . white line recognition camera
7 . . . sign recognition camera
10 . . . curve
10a . . . white line
11 . . . straight line portion 12 ... curve easement portion
13 ... perfect circle curve portion
15 ... traffic sign

The invention claimed is:

1. A driving support system comprising:
a curve information acquisition unit configured to acquire information on a shape of a curvature changing portion in a road, said road having the curvature changing portion of which a radius of curvature changes according to a predetermined function;
a driving support unit configured to perform driving support for a driver at the time when a vehicle moves in said curvature changing portion; and
a driving support control unit configured to decide timing at which said driving support unit performs driving support, based on the information on the shape of said curvature changing portion acquired by said curve information acquisition unit;
characterized in that
said driving support control unit decides the timing at which said driving support unit performs driving support, based on a length of said curvature changing portion; and
in cases where the length of said curvature changing portion is equal to or more than a threshold value, said driving support control unit makes a decision that said driving support unit performs driving support.

2. The driving support system as set forth in claim 1, characterized in that said threshold value is set based on at least either one of a minimum easement length of a traveling lane of said vehicle according to a construction ordinance, a distribution of an actual length of said curvature changing portion in the traveling lane of said vehicle, and a length of said curvature changing portion at which the driver of said vehicle misjudged in the past that said curvature changing portion ended.

3. The driving support system as set forth in claim 1, characterized in that said driving support control unit decides the timing at which said driving support unit performs driving support, based on a length of said curvature changing portion and a speed of said vehicle.

4. The driving support system as set forth in claim 1, characterized in that said driving support is a warning that is issued to the driver.

5. The driving support system as set forth in claim 1, characterized in that said driving support is either automatic deceleration control of the speed of said vehicle or lane keeping control.

6. The driving support system as set forth in claim 1, characterized in that said driving support control unit decides the timing at which said driving support unit performs driving support, based on a period of time for which said vehicle moves in said curvature changing portion along the shape of said curvature changing portion.

7. The driving support system as set forth in claim 6, characterized in that in cases where the period of time for which said vehicle moves in said curvature changing portion is equal to or more than a time threshold value, said driving support control unit makes a decision that said driving support unit performs driving support.

8. The driving support system as set forth in claim 7, characterized in that said time threshold value is set based on a period of time at which the driver of said vehicle misjudged in the past that said curvature changing portion ended.

9. A driving support system comprising:
a curve information acquisition unit configured to acquire information on a shape of a curvature changing portion in a road, said road having the curvature changing portion of which a radius of curvature changes according to a predetermined function;
a driving support unit configured to perform driving support for a driver at the time when a vehicle moves in said curvature changing portion; and
a driving support control unit configured to decide timing at which said driving support unit performs driving support, based on the information on the shape of said curvature changing portion acquired by said curve information acquisition unit;
characterized in that
said driving support control unit decides the timing at which said driving support unit performs driving support, based on a period of time for which said vehicle moves in said curvature changing portion along the shape of said curvature changing portion; and
in cases where the period of time for which said vehicle moves in said curvature changing portion is equal to or more than a time threshold value, said driving support control unit makes a decision that said driving support unit performs driving support.

* * * * *